United States Patent [19]

Tsukamoto

[11] Patent Number: 4,757,340
[45] Date of Patent: Jul. 12, 1988

[54] FOCUSING APPARATUS FOR CAMERA
[75] Inventor: Masaaki Tsukamoto, Kawasaki, Japan
[73] Assignee: Nippon Kogaku K. K., Tokyo, Japan
[21] Appl. No.: 1,522
[22] Filed: Jan. 8, 1987
[30] Foreign Application Priority Data Jan. 14, 1986 [JP] Japan .............................. 61-3307[U]

[51] Int. Cl.4 .............................................. G03B 3/00
[52] U.S. Cl. .................................. 354/400; 354/195.1; 354/195.13; 354/199
[58] Field of Search ............... 354/400, 402, 404, 405, 354/409, 195.1, 195.13, 199, 219, 289.1

[56] References Cited

U.S. PATENT DOCUMENTS 4,182,555  1/1980  Imura et al. ..................... 354/195.13
4,294,526  10/1981  Nakagawa ........................ 354/195.1

FOREIGN PATENT DOCUMENTS 61523  5/1979  Japan .

Primary Examiner—M. B. Perkey
Attorney, Agent, or Firm—Shapiro and Shapiro

[57] ABSTRACT

A camera is provided with an automatic focusing apparatus in which an imaging lens moved for focusing is locked by an identical locking member in both the automatic and manual focusing operation. The focusing apparatus has a single locking member for locking movement of an imaging lens. The locking member is displaced at a predetermined position in accordance with a signal corresponding to a distance to an object in an automatic focusing mode, and is displaced at a position corresponding to a distance set by a manual distance setting member when the focusing mode is switched to the manual mode.

8 Claims, 1 Drawing Sheet

FOCUSING APPARATUS FOR CAMERA

BACKGROUND OF THE INVENTION

1. Field of the Invention

The present invention relates to a focusing apparatus for a camera and, more particularly, to a focusing apparatus for a camera, which can switch automatic and manual focusing operations.

2. Related Background Art

A camera comprising an automatic focusing apparatus has a distance-measurement device for measuring a distance to an object and outputting a distance-measurement signal according to the measurement result, and a lens driving device for moving an imaging lens along an optical axis for focusing. The imaging lens which is moved along the optical axis in accordance with a shooting operation is locked by a locking member which is operated in response to the distance-measurement signal and determines the position of the lens along the optical axis. In some cameras with the automatic focusing apparatus of this type, an object distance can be manually set in advance in the case of imaging of an unclear object with low constrast or fine patterns whose distance is difficult to measure, imaging under bad conditions where dust or water droplets become attached to the distance-measurement device, or underwater imaging where projection light for distance measurement is considerably attenuated and distance measurement may be rendered impossible.

A camera with an automatic focusing apparatus which can manually set a distance is disclosed in, e.g., Japanese Patent Application Laid Open No. 61,523/1979. In this known camera, in order to lock an imaging lens which is movable along the optical axis at a position along the optical axis corresponding to an object distance, another locking member for manually adjusting a distance is arranged in addition to the locking member for automatic focusing. In the case of the manual distance adjustment, the imaging lens is locked at a predetermined position by the locking member for the manual adjustment. In the case of automatic adjustment, after the imaging lens is moved to a reset position, the imaging lens is moved from the reset position and is locked by the locking member for the automatic focusing to allow its focusing operation. For this purpose, when a focusing mode is switched from the manual to automatic mode, moving means for moving the imaging lens to the reset position is necessary. On the other hand, when the focusing mode is switched from the automatic to manual mode, canceling means for canceling the locking of the imaging lens at the reset position must be arranged. This results in a complex arrangement, and requires an increase in the number of parts.

SUMMARY OF THE INVENTION

It is an object of the present invention to provide a focusing apparatus for a camera which is free from the drawbacks of the conventional focusing apparatus, and can switch automatic and manual focusing operations using a simple arrangement.

It is another object of the present invention to provide a camera with an automatic focusing apparatus in which an imaging lens moved for focusing is locked by an identical locking member in both the automatic and manual focusing operations.

In order to achieve the above objects, the focusing apparatus according to the present invention has a single locking member for locking movement of an imaging lens by means of a lens driving device. The locking member is displaced at a predetermined position in accordance with a signal corresponding to a distance to an object, which is output from a distance-measurement device in an automatic focusing mode, and terminates the movement of the imaging lens at that position. When the focusing mode is switched from the automatic to manual mode, the locking member is displaced at a position corresponding to a distance set by a manual distance setting member and interlocked with the manual distance setting member, thereby terminating the movement of the imaging lens at that position.

As described above, when an imaging lens which is moved for focusing is locked by an identical locking member in both the manual and automatic focusing modes, a mechanism for adjusting the displacement of the imaging lens can be simplified in the present invention. A distance to an object is preset by the manual distance setting member, and the imaging lens is moved from the reset position in accordance with the shooting operation and is locked by the locking member at a position corresponding to the preset distance. For this reason, a reset canceling device for a lens which is operated upon selection of the manual focusing mode need not be arranged unlike in the conventional focusing apparatus. When the focusing mode is switched from the manual to automatic mode, a returning device for returning the lens to its reset position need not also be provided.

The present invention will be apparent from the following detailed description taken in conjunction with the accompanying drawings.

DESCRIPTION OF THE PREFERRED EMBODIMENTS

Figure 1:
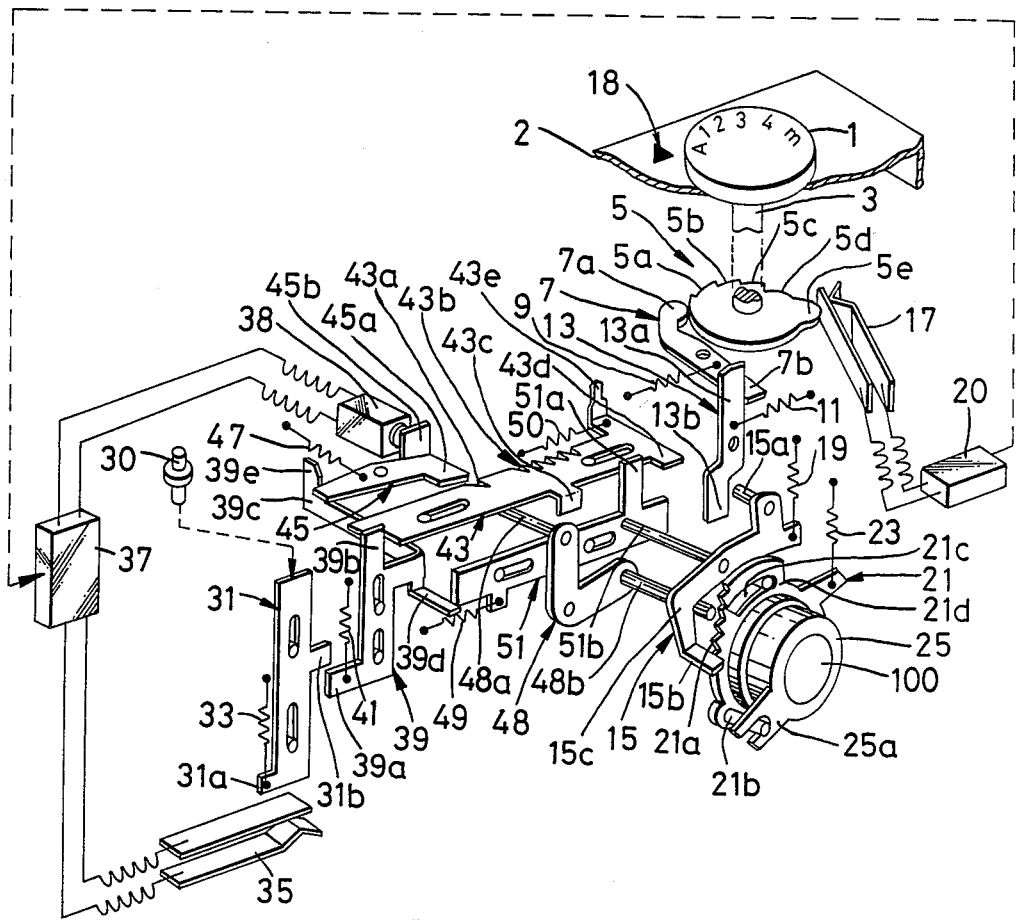
FIG. 1 is a perspective view showing an embodiment of the present invention.

In an apparatus shown in FIG. 1, according to the embodiment of the present invention, a manual distance setting dial 1 is arranged on an upper cover 2 of a camera housing. A cam plate 5 is fixed to the dial 1 through a shaft 3, and is pivotal with the dial 1. The cam plate 1 has cam surface 5a to 5d and a cam projection 5e. The cam surface 5a to 5d can be engaged with one arm 7a of a driven lever 7 which is biased clockwise by a spring 9. The other arm 7b of the lever 7 is engaged with an arm 13a of an intermediate lever 13 which is biased clockwise by a spring 11. The other arm 13b of the intermediate lever 13 faces an engaging pin 15a projecting from a locking lever 15, and can be engaged therewith. A switch 17 is arranged on a pivoting path of the cam projection 5e. The switch 17 is turned on or off in accordance with the pivot position of the projection 5e. The switch 17 is connected to a distance-measurement device 20. The distance-measurement device 20 which is enabled by turning on the switch 17 outputs a distance-measurement signal corresponding to a distance to an object to a magnet control circuit 37 at a predetermined timing. The dial 1, the cam plate 5, the driven lever 7, the spring 9, the lever 13, and the spring 11 constitute a manual distance setting mechanism.

As can be seen from FIG. 1, a symbol "A" and numerals "1, 2, 3 and 4" are printed on the dial 1. When an index 18 provided on the upper cover 2 of the camera is adjusted to the symbol "A", the switch 17 is turned on by the cam projection 5e to set an automatic focusing mode. If any one of numerals "1" to "4" is adjusted to the index 18, an imaging lens 100 is moved to a position along the optical axis corresponding to the selected numeral, as will be described later, and allows a manual imaging distance setting operation.

The locking lever 15 is biased counterclockwise by a spring 19, and its arm 15b faces a stepped ratchet portion 21a of a distance ring 21 to be engageable therewith. The distance ring 21 is pivotally arranged to be coaxial with the optical axis of the imaging lens 100, and is biased counterclockwise by a spring 23. A pin 21b projecting forward from the distance ring 21 of the camera is fitted in a fork 25a formed on a lens displacing portion 25, and the imaging lens 100 is displaced by the lens displacing portion 25 which is rotated together with the distance ring 21. The distance ring 21, the spring 23, and the lens displacing portion 25 constitute a lens driving device.

A release rod 31 interlocked with a release button 30 is vertically slidably guided by a camera body, and is always biased upward by a spring 33. A switch 35 is arranged along a moving path of an arm 31a of the release rod 31. When the release rod 31 is pressed downward, the switch 35 is pressed downward by the arm 31a of the release rod 31, and an electromagnet 38 is energized through the magnet control circuit 37. A locking lever 39 is verically slidably guided by the camera body (not shown) in FIG. 1, and is always biased upward by a spring 41. An arm 39a of the locking lever 39 can abut against and be engaged with the arm 31b of the release rod 31. The locking lever 39 further has arms 39b, 39c and 39d.

An AF (auto-focus) actuating plate 43 is horizontally slidably guided by the camera body in FIG. 1, and is always biased in the horizontal direction by a spring 50. The AF actuating plate 43 is locked by the arm 39b of the locking lever 39 which projects on the moving path of the AF actuating plate 43, thus suppressing the biasing force of the spring 50. The AF actuating plate 43 has a lock grove 43a and a plurality of ratchet teeth 43b. The lock grove 43a and the ratchet teeth 43b face a pawl 45a of a stop lever 45 to be engageable therewith. The stop lever 45 is biased clockwise by a spring 47, and the biasing force of the spring 47 is suppressed by the arm 39c of the locking lever 39, which projects on the pivoting path of the lever 45. The stop lever 45 has an armature 45b at a position facing the electromagnet 38.

Furthermore, the AF actuating plate 43 has arms 43c and 43d. The arm 43c can be engaged with a pin 48a of a pivotal intermediate lever 48, and the arm 43d can be engaged with an arm 51a of a charge plate 51 which is always biased to the left in FIG. 1 by a spring 49. The charge plate 51 is horizontally slidably guided by the camera body. The biasing force of the spring 49 is suppressed by the arm 39d of the locking lever 39 projecting on the moving path of the charge plate 51. The charge plate 51 which is moved to the left by the biasing force of the spring 49 is returned to the right by a wind-up mechanism (not shown) against the biasing force of the spring 49.

A pin 48b projecting forward from the intermediate lever 48 of the camera can be engaged with a bent portion 15c of the locking lever 15. The locking lever 15 is pivoted clockwise by counterclockwise pivotal movement of the intermediate lever 48 upon movement of the AF actuating plate 43, and the position of the arm 15b is thus determined. A pin 51b projecting forward from the charge plate 51 of the camera is inserted through an elongated hole 21c of the distance ring 21. When the charge plate 51 is moved to the right to be charged, the distance ring 21 is pivoted clockwise while depressing an edge portion 21d of the elongated hole 21c against the biasing force of the spring 23, thereby setting an initial position (the reset position of the lens 100), as shown in FIG. 1.

Figure 2:
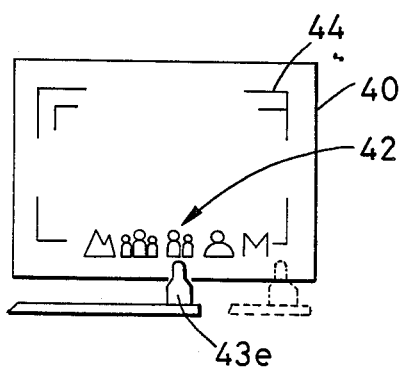
FIG. 2 is a plan view showing a zone focus mark in a finder of a camera used in the embodiment shown in FIG. 1.

Note that the AF actuating plate 43 has a zone focus index 43e. As shown in FIG. 2, the zone focus index 43e projects in a viewfinder 40, and is moved from a position indicated by the broken line in FIG. 2 to a position indicating any of zone focus marks 42 in accordance with the movement of the AF actuating plate 43. Note that in FIG. 2, reference numeral 44 indicates a view frame.

The operation of the embodiment with the above arrangement will be described in detail in consideration of automatic focusing and manual distance adjustment.

(AUTOMATIC FOCUSING)

When the symbol "A" of the dial 1 is adjusted to the index 18, the switch 17 is turned on by the cam projection 5e and the distance-measurement device 20 enabled. When the release rod 31 is pressed downward in FIG. 1 interlocked with the release button 30, the switch 35 is turned on by the arm 31a, thereby supplying power from the control circuit 37 to the electromagnet 38. Thus, the armature 45b of the stop lever 45 is attracted to the electromagnet 38. Although the stop lever 45 is biased clockwise by the spring 47, since the attracting force of the electromagnet 38 is set to be stronger than the biasing force of spring 47, the stop lever 45 is pivoted counterclockwise, and is held in position while the armature 45b is attracted to the electromagnet 38.

When the release rod 31 is further pressed downward, the arm 31b abuts against and is engaged with the arm 39a of the locking lever 39 to displace the locking lever 39 downward. Thus, the AF actuating plate 43, the locking lever 45, and the charge plate 51 are released from the locking lever 39, and the AF actuating plate 43 and the charge plate 51 are moved to the left by the biasing forces of the springs 50 and 43, respectively. The control circuit 37 receives a signal corresponding to a distance to an object from the distance-measurement device 20, and shuts off the power supply to the electromagnet 38 at a predetermined timing, thus deenergizing the electromagnet 38. Then, the stop lever 45 is pivoted clockwise by the biasing force of the spring 47. While the stop lever 45 is attracted by the electromagnet 38, the AF actuating plate 43 is moved to the left in FIG. 1. However, when the electromagnet 38 is deenergized, the stop pawl 45a of the stop lever 45 is engaged with the appropriate position of the ratchet teeth 43b, i.e., a ratchet tooth corresponding to the measured distance to the object, thus stopping the movement of the AF actuating plate 43.

Upon left movement of the AF actuating plate 43, the arm 43c thereof is engaged with the pin 48a of the intermediate lever 48, and the intermediate lever 48 is pivoted counterclockwise in accordance with the displacement of the AF actuating plate 43. As a result, the pin 48b of the intermediate lever 48 causes the locking lever 15 to pivot clockwise in accordance with the displacement of the AF actuating plate 43. At this time, since the pin 51b which is inserted through the elongated hole 21c of the distance ring 21 is moved toward the left side of the elongated hole 21c upon left movement of the charge plate 51, the distance ring 21 is pivoted counterclockwise by the spring 23. Then, the distance ring 21 is stopped at a position at which the stepped ratchet 21a of the ring 21 is engaged with and locked by the arm 15b of the locking lever 15, thereby determining the displacement of the imaging lens 100.

Thereafter, a shutter is driven by a shutter device (not shown) to expose a film. When the downward depressing force applied on the release rod 31 is canceled, the release rod 31 is returned upward by the biasing force of the spring 33. Then, when the charge plate 51 is moved to the right by the wind-up mechanism (not shown) to charge the spring 49, the arm 51a of the charge plate 51 presses the arm 43d of the AF actuating plate 43 to the right. Therefore, the AF actuating plate 43 is moved to the right against the biasing force of the spring 50. The and the upward biasing force of the spring 41 applied to the locking lever 39 the locking lever 39 upward, returning it to a state as shown in FIG. 1. At this time, the stop lever 45 is pivoted counterclockwise by an inclined surface 39e provided at the distal end of the arm 39c, and engagement between the stop pawl 45a and the AF actuating plate 43 is canceled as shown in FIG. 1. When the charge plate 51 is moved to the right, the pin 51b thereof causes the distance ring 21 to pivot clockwise, and again charges the spring 23 of the distance ring 21.

(MANUAL DISTANCE SETTING)

When the dial 1 is pivoted from the position of symbol "A" so that any one of the numerals "1" to "4" indicating preset distances is adjusted to the index 18, the cam projection 5e is pivoted to turn off the switch 17. The turn-off signal is supplied to the control circuit 37 through the distance-measurement device 20. The control circuit 37 shuts off the power supply to the electromagnet 38. Thus, the stop lever 45 is free from the engagement. For example, when the numeral "1" of the dial 1 is adjusted to the index 18 and arm 7a of the lever 7 abuts against the cam surface 5a, the lever 7 is pivoted clockwise by a predetermined distance. Thus, the locking lever 15 is also pivoted clockwise through the intermediate lever 13 in accordance with the pivot distance of the lever 7, thus determining the position of the arm 15b.

When the release rod 31 is pressed downward interlocked with the release button 30, the locking lever 39 is pressed downward as described in the automatic focusing mode, and the stop lever 45, the AF actuating plate 43, and the charge plate 51 are influenced by their biasing forces. Since the stop lever 45 has been already free from its engagement, the stop pawl 45a of the stop lever 45 is immediately engaged with the lock groove 43a of the AF actuatiing plate 43, thus interrupting the left movement of the AF actuating plate 43. Thus, the intermediate lever 48 is not pivoted, and therefore, the position of the arm 15b of the locking lever 15 is determined in accordance with only the distance set by the dial 1. Meanwhile, since the charge plate 51 is moved to the left by the biasing force of the spring 49, the distance ring 21 is pivoted counterclockwise by the biasing force of the spring 23, and its stepped ratchet 21a is engaged with the arm 15b of the locking lever 15 and locked in position. Consequently, the imaging lens 100 is moved by a length corresponding to the distance of 1 m set by the dial 1.

In this case, the focus zone index 43e is locked at a position of a zone focus symbol "M" in FIG. 2 since the AF actuating plate 43 is locked by the stop lever 45 at its lock groove 43a, thus signalling to a user the manual distance setting mode by means of the dial 1.

According to the embodiment shown in FIG. 1, a helicoid portion of the imaging lens need not be directly operated from the outside of a lens barrel in the manual distance setting mode. Therefore, when the apparatus according to the embodiment of the present invention is assembled in an underwater camera with high water resistance, a seal member such as an O-ring need only be equipped in a portion between the shaft 3 and the upper cover 2, resulting in a simple water-resistance arrangement.

What is claimed is:

1. A focusing apparatus for a camera, comprising:
   an imaging lens system which is moved for focusing along an optical axis from an initial position;
   distance-measurement means for generating an output signal corresponding to a distance to an object;
   lens driving means which is displaced in correspondence with movement of said imaging lens system from the initial position so as to drive said imaging lens system;
   locking means for locking displacement of said lens driving means, said locking means having variable locking positions and being coupled to said lens driving means at each locking position, and displacement of said lens driving means being changed in correspondence to variations in locking positions;
   means for manually setting a distance signal corresponding to a distance to the object;
   first means for determining the locking position of said locking means in response to the output signal from said distance-measurement means; and
   second means for determining the locking position of said locking means in response to the distance signal set by said manual setting means;
   wherein said first determining means includes an auto-focus actuating member which moves prior to the displacement of said lens driving means, a stop pawl for restricting movement of said auto-focus actuating member in accordance with the output signal from said distance-measurement means, and an intermediate member for displacing said locking means in accordance with movement of said auto-focus actuating member, said manual setting means includes a switching member, which can be displaced between automatic and manual positions, for switching automatic and manual focusing modes, and switch means which is actuated by said switching member, and said auto-focus actuating member has a lock groove which can be engaged with said stop pawl when the switching member is set at the manual position, and a plurality of ratchet teeth which can be engaged with the stop pawl when the switching member is set at the automatic position.

2. An apparatus according to claim 1, wherein said first determining means further includes an index which is moved together with said auto-focus actuating member, and said index indicates a zone focus mark provided in a viewfinder of a camera when said stop pawl is engaged with one of said ratchet teeth of said auto-focus actuating member, and indicates a manual focusing indication arranged adjacent to said zone focus mark when the stop pawl is engaged with said lock groove.

3. A focusing apparatus for a camera, comprising:
an imaging lens system which is moved for focusing along an optical axis from an initial position;
distance-measurement means for generating an output signal corresponding to a distance to an object;
lens driving means which is displaced to drive said imaging lens system;
means for locking displacement of said lens driving means, said locking means including a single locking member having a plurality of locking positions and being selectively coupled to said lens driving means at any one of said locking positions, to provide corresponding limited displacement of said lens driving means;
first means for selecting one of said locking positions of said single locking member in response to the output signal from said distance-measurement means;
said first selecting means including an actuating member which moves prior to the displacement of said lens driving means, means for restricting movement of said actuating member in accordance with the output signal from said distance-measurement means and means for varying said locking position of said single locking member in correspondence with the movement of said actuating member; and
second means, including means for manually setting a distance signal corresponding to a distance to the object, for selecting one of said locking positions of said single locking member in response to the distance signal set by said manual setting means.

4. An apparatus according to claim 3 further comprising means for selectively switching automatic and manual focusing modes, and control means, responsive to said switching means, for enabling said first selecting means and disabling said second selecting means when the automatic focusing mode is selected, and enabling said second selecting means and disabling said first selecting means when the manual focusing mode is selected.

5. An apparatus according to claim 4, wherein said restricting means includes a plurality of ratchet teeth provided on said actuating member, and a pawl member being connected with said ratchet teeth in response to said output signal from said distance-measurement means when the automatic focusing mode is selected.

6. An apparatus according to claim 3, wherein said single locking member has an initial position, and said apparatus further comprises means for moving said single locking member from said initial position to a locking position in response to a starting operation for an exposure and moving said single locking member from said locking position to said initial position in response to termination of said exposure.

7. An apparatus according to claim 3 further comprising means for selectively switching automatic and manual focusing modes, and means for preventing the movement of said actuating member when the manual focusing mode is selected.

8. An apparatus according to claim 7 further comprising a viewfinder provided with a zone focus mark and a manual focusing indication, and an index provided on said actuating member so as to indicate said zone focus mark when said actuating member is restricted by said restricting means and indicate said manual focusing indication when said actuating member is prevented by said preventing means.

* * * * *